United States Patent
Clymans

(10) Patent No.: US 10,322,913 B2
(45) Date of Patent: Jun. 18, 2019

(54) DEVICE AND METHOD FOR PLACING A ROTOR BLADE OF A WIND TURBINE

(71) Applicant: High Wind N.V., Swijndrecht (BE)

(72) Inventor: Etienne Clymans, Willebroek (BE)

(73) Assignee: High Wind N.V., Zwijndrecht (BE)

(*) Notice: Subject to any disclaimer, the term of this patent is extended or adjusted under 35 U.S.C. 154(b) by 342 days.

(21) Appl. No.: 14/767,674

(22) PCT Filed: Feb. 18, 2014

(86) PCT No.: PCT/IB2014/059069
§ 371 (c)(1),
(2) Date: Aug. 13, 2015

(87) PCT Pub. No.: WO2014/125461
PCT Pub. Date: Aug. 21, 2014

(65) Prior Publication Data
US 2015/0368075 A1 Dec. 24, 2015

(30) Foreign Application Priority Data

Feb. 18, 2013 (BE) ................................. 2013/0108
Mar. 28, 2013 (BE) ................................. 2013/0217

(51) Int. Cl.
*B66C 23/18* (2006.01)
*B66C 23/52* (2006.01)
(Continued)

(52) U.S. Cl.
CPC ............ *B66C 23/185* (2013.01); *B66C 13/06* (2013.01); *B66C 23/52* (2013.01); *F03D 13/10* (2016.05)

(58) Field of Classification Search
CPC ........ B66C 23/00; B66C 23/06; B66C 23/18; B66C 23/185; B66C 23/207; B66C 23/26;
(Continued)

(56) References Cited

U.S. PATENT DOCUMENTS 8,070,000 B2 * 12/2011 Botwright ............... B66C 1/108
212/227
8,317,244 B1 * 11/2012 Schuyleman ........... B66C 1/105
294/67.5
(Continued)

FOREIGN PATENT DOCUMENTS

DE 29908395 U1 9/1999
DE 102011015881 A1 10/2012
(Continued)

OTHER PUBLICATIONS

ISR/WO/IPRP for related U.S. Appl. No. 14/653,313 dated Jun. 23, 2015.
(Continued)

*Primary Examiner* — Michael R Mansen
*Assistant Examiner* — Juan J Campos, Jr.
(74) *Attorney, Agent, or Firm* — The Webb Law Firm

(57) ABSTRACT

A device for placing a rotor blade of a wind turbine. The device includes a hoisting means on a surface of which a boom rotatable around a substantially vertical rotation axis is provided with at least one hoisting cable. The at least one hoisting cable includes an attaching means, to which a rotor blade for placing can be attached via an elongate hoisting yoke, the hoisting yoke extending in a longitudinal direction of the rotor blade. The boom includes a guide device to limit movement of the hoisting yoke in a direction running transversely of the lifting plane. The device or hoisting yoke further includes a displacer for displacing the hoisting yoke or parts of the hoisting yoke in the longitudinal direction of the rotor blade. A method which makes use of the invented device.

22 Claims, 6 Drawing Sheets

(51) Int. Cl.
*B66C 13/06* (2006.01)
*B66C 13/10* (2006.01)
*F03D 13/10* (2016.01)

(58) Field of Classification Search
CPC ....... B66C 23/52; B66C 23/525; B66C 23/53; B66C 23/60; B66C 23/605; B66C 13/00; B66C 13/04; B66C 13/06; B66C 13/10; F03D 13/10
See application file for complete search history.

(56) References Cited

U.S. PATENT DOCUMENTS

| | | |
|---|---|---|
| 2007/0266538 A1 | 11/2007 | Bervang |
| 2008/0216301 A1 | 9/2008 | Hansen et al. |
| 2008/0307647 A1* | 12/2008 | Kessler ................ F03D 1/0658 29/889 |
| 2009/0025219 A1* | 1/2009 | Hansen ................... B66C 1/108 29/889 |
| 2011/0123274 A1 | 5/2011 | Soe-Jensen |
| 2011/0221215 A1 | 9/2011 | Botwright |
| 2013/0125397 A1 | 5/2013 | Van den Berg |
| 2015/0368075 A1 | 12/2015 | Clymans |

FOREIGN PATENT DOCUMENTS

| | | |
|---|---|---|
| DE | 102011116189 B3 | 10/2012 |
| EP | 2364949 A1 | 9/2011 |
| WO | 2008061797 A1 | 5/2008 |
| WO | 2009041812 A1 | 4/2009 |
| WO | 2012002809 A1 | 1/2012 |

OTHER PUBLICATIONS

ISR/WO (PCT/IB2013/058167) for related U.S. Appl. No. 14/424,272, dated Mar. 3, 2015.

* cited by examiner

DEVICE AND METHOD FOR PLACING A ROTOR BLADE OF A WIND TURBINE

CROSS-REFERENCE TO RELATED APPLICATIONS

This application is the United States national phase of International Application No. PCT/IB2014/059069 filed Feb. 18, 2014, and claims priority to Belgian Patent Application Nos. 2013/0108 and 2013/0217 filed Feb. 18, 2013 and Mar. 28, 2013, respectively, the disclosures of which are hereby incorporated in their entirety by reference.

BACKGROUND OF THE INVENTION

Field of the Invention

The invention relates to a device for placing a rotor blade of a wind turbine. The invention likewise relates to a method for placing components of a structure. The invention likewise relates to a method for placing a rotor blade of a wind turbine while making use of the device.

Although the invention will be elucidated mainly within the context of assembling a high structure such as a wind turbine at sea, the device and method according to the invention can expressly be used both on land (onshore) and at sea (offshore).

Description of Related Art

The number of high structures erected, maintained or repaired at sea is growing. A typical example is a wind turbine comprising a gondola (or nacelle) which is placed on a mast and forms the housing for electromechanical equipment such as a power generator. The nacelle is provided with a hub on which a number of rotor blades are arranged. The rotor blades convert the kinetic energy of the wind into a rotating movement of the shaft of the nacelle, which is converted into electrical energy by the power generator.

During the placing of components, in particular rotor blades, of such large structures the rotor blades are manipulated according to the prior art by a crane placed on a surface, and placed on an already available nacelle on a support structure. In the case of a wind turbine the support structure can for instance comprise a mast placed on a suitable foundation.

The lifting and placing of large, slender components, in particular wind turbine blades, is hampered by wind load. Wind turbine blades attached to the crane can be exposed here to great and unexpected movements relative to the support structure or relative to already installed components. This makes assembly very much more difficult, or even impossible in the case of strong wind load. A wind turbine blade has to be attached by means of bolt connections to the nacelle hub, this requiring a precise positioning of the wind turbine blade relative to a nacelle already installed on a mast.

SUMMARY OF THE INVENTION

An object of the present invention is to provide a device with which a rotor blade of a wind turbine can be placed and mounted in a manner less susceptible to wind than is known in the prior art.

This object is achieved with a device having a hoisting means which is placed on a surface and of which a boom rotatable around a substantially vertical rotation axis is provided with at least one hoisting cable, wherein the hoisting cable comprises an attaching means, such as a hoisting hook, to which a rotor blade for placing can be attached via an elongate hoisting yoke mounted on the attaching means, the hoisting yoke extending in a longitudinal direction of the rotor blade, wherein a lifting plane is defined by the boom and the substantially vertical rotation axis, wherein the boom further comprises a guide device which is configured to limit movement of the hoisting yoke in a direction running transversely of the lifting plane and which is connected to the boom by means of a displacing device displaceable along a longitudinal axis of the boom. A rotor blade attached to the hoisting yoke will generally extend in a longitudinal direction of the elongate hoisting yoke.

Lifting a component suspended from a hoisting cable is susceptible to wind. By making use of the guide device the movement of the hoisting yoke is limited, at least during a part of the lifting and lowering, at the moment components are being coupled for assembly purposes. Undesirable movements of the component are hereby likewise limited and a large structure can be assembled in more efficient and safer manner. By further suspending the hoisting yoke from two hoisting cables engaging at a distance from each other in the longitudinal direction of the hoisting yoke (and so also of the rotor blade) it is possible to realize a displacement of the rotor blade in the longitudinal direction of this rotor blade using a displacing means of the hoisting yoke, this without undesirable displacements of the bolts in the rotor blade root substantially at right angles to the longitudinal direction of the rotor blade, and without undesirable forces on the guide device. A horizontal displacement of the centre of gravity of the rotor blade only causes a differing tensile load in the hoisting cables.

In an embodiment of the invention, a device is provided wherein the boom is provided with at least two hoisting cables, wherein the hoisting cables each comprise an attaching means. The at least two attaching means are preferably connected at a distance from each other to the hoisting yoke in the longitudinal direction of the hoisting yoke.

In yet another preferred embodiment of the invention a device is provided wherein the guide device is configured to also limit movements of the hoisting yoke in the lifting plane. Wind forces can hereby cause substantially no displacement of the hoisting yoke at all.

A further advantage of the invented device is that it allows work to take place in highly unfavourable conditions, whereas the known device can only be deployed up to determined wind speeds. The assembly time of a structure can hereby be significantly reduced. The guide device can be easily displaced along the longitudinal axis of the boom, for instance away from an attaching means, whereby the hoisting means can operate as a hoisting means known from the prior art. By releasing the attaching means there continues to be good accessibility from the deck of the surface to components to be taken up by the hoisting means.

In the case the device is applied for assembly at sea of a structure constructed from components, in particular a wind turbine, the surface preferably comprises a vessel, and more preferably a jack-up platform. For assembly of the structure on land the surface can optionally be formed by the ground or for instance by a bearing structure provided for the hoisting means.

In an embodiment of the invention a device is provided in which the hoisting cables are connected to the boom. Such an embodiment avoids the use of a separate hoisting means for the hoisting cables connected to the hoisting yoke.

It is further advantageous here to characterize an embodiment of the device in that it and/or the hoisting yoke comprises means for displacing and/or rotating respectively the hoisting yoke and/or parts of the hoisting yoke. This embodiment has the advantage that, once the rotor blade has been carried by the hoisting means into the vicinity of the desired installation position, it can be displaced and rotated in precise manner about a rotation axis in order to carry the component accurately to the installation position. This feature provides the option of mounting the wind turbine blade on a hub of a wind turbine nacelle, even when the blade mounting of the hub forms an angle other than zero with the horizontal. Precise displacements of the hoisting yoke enable a blade to be mounted without additional movements of the hoisting means.

A further improved embodiment provides a device in which the hoisting yoke comprises means for displacing respectively the hoisting yoke and/or parts of the hoisting yoke in the longitudinal direction of a rotor blade, suspended to the hoisting yoke. Herewith, the rotor blade may be displaced in an accurate manner along its longitudinal direction. Such a hoisting yoke is relatively simple and will suffice because the at least two hoisting cables engaging at a distance from each other in the longitudinal direction compensate the displacement in centre of gravity without undesirable displacements of the attaching part of the rotor blade occurring and without the guide device being subjected to undesirable loads.

An embodiment of the device has the feature that it comprises means for rotating respectively the hoisting yoke and/or parts of the hoisting yoke about a horizontal and/or vertical axis located in the lifting plane. A preferred embodiment has the feature that the device comprises rotation means for rotating respectively the hoisting yoke and/or parts of the hoisting yoke solely about a horizontal or vertical axis located in the lifting plane. Such an embodiment makes it possible to place the hoisting yoke parallel to a rotor blade—stored elsewhere or on a support face of the surface—so that it can be picked up easily. Once the rotor blade has been lifted off the support face, the hoisting yoke can if desired be rotated such that the longitudinal direction of the rotor blade comes to lie parallel to the connecting line of the two connecting means. A rotation around a horizontal axis at right angles to the longitudinal direction of the rotor blade is desirable on the one hand in order to correct angular deviations of the rotor blade and on the other to realize a mounting angle of 30°.

A particularly advantageous embodiment of the invention provides a device, the hoisting yoke of which comprises a rotor blade spreader which can be oriented. The rotor blade spreader is an elongate structure with a longitudinal direction, a transverse direction and a vertical direction which in the present embodiment corresponds to the lifting direction. The spreader is provided with means for rotating the spreader round a longitudinal axis and for pivoting thereof round a vertical axis, for instance by means of a motor-driven pinion. In addition, the length of the spreader in the longitudinal direction is preferably telescopically adjustable. It can thus be adjusted to the length of the engaging part of an elongate component, such as for instance a wind turbine blade. It is also advantageous for the spreader to be provided with a mechanism to enable sliding of the rotor blade in the longitudinal direction. The centre of gravity can hereby be made adjustable and the fastening bolts of a rotor blade can be pushed during assembly via a translation into the corresponding holes in the hub without additional displacement of the hoisting means. The spreader is further provided with engaging means in the form of for instance gripper arms, slings, clamping mechanisms and the like to enable securing of the rotor blade for placing.

The device according to the invention is particularly suitable for manipulating a rotor blade of a wind turbine wherein the rotor blade is placed in a substantially horizontal position or in a position inclining substantially 30° relative to the horizontal. The invented device enables assembly of rotor blades of offshore wind turbines up to wind speeds of 12 m/s and more, where with the known device individual rotor blades can be assembled up to only 8 m/s.

In an embodiment of the invention the hoisting yoke comprises a guide case, preferably between the at least two hoisting cables, which fits with little clearance in a guide structure of the guide device. In an embodiment the guide case has two wheels on which the guide device rests while applying a limited force. The hoisting winch of the guide device is provided for this purpose with a constant tension operation mode. The guide device hereby follows passively the lifting and paying out of the hoisting yoke with the hoisting means.

The guide device can if desired comprise a clamping device for the guide case of the hoisting yoke, whereby movement of the hoisting yoke relative to the guide device is substantially prevented. This further reduces the susceptibility to wind during lifting of a rotor blade.

By making use of a guide device with catching construction instead of a clamping device the movement of the hoisting yoke is temporarily limited in at least two directions and made substantially independent of the wind load. The component can be positioned relative to a support structure by rotating the hoisting means about a vertical axis, rotating the boom of the hoisting means up and downward in the lifting plane and/or moving the hoisting yoke up and downward with the hoisting cable. When a component has been brought into the vicinity of a part to which the component has to be coupled, the guide case of the hoisting yoke according to the invention is preferably temporarily received in or taken up by the catching construction. Because the catching construction is however configured to displace the hoisting yoke parallel to the lifting plane between a position in the vicinity of the boom and a position further removed from the boom and/or vice versa, a substantially wind-independent fine positioning of the component is made possible.

The guide device can comprise a frame of mutually connected beams, of which at least two beams extend from the boom in the direction of the centre between the attaching means and at least partially enclose the guide case of the hoisting yoke. The at least two beams can for instance be connected to a base beam running in a transverse direction of the boom. The two beams run on either side of the attaching means and therefore limit the movement of the attaching means in a direction transversely of the beams. Movements of the attaching means in other directions, for instance in a lifting direction, are thus substantially unimpeded.

The at least two beams generally extend substantially perpendicularly of the longitudinal axis of the boom because in this way they cover the greatest distance from the boom. Although this distance is in principle not limited, the at least two beams extend from the boom over for instance a perpendicular distance of a maximum of twice the boom width. The boom width is understood to mean the transverse dimension of the boom running perpendicularly of the longitudinal axis of the boom and perpendicularly of the direction of the beams.

The clamping device can be formed by at least one clamping beam which is attached to the at least one beam and which is displaceable to the guide case of the hoisting yoke until clamping takes place. This embodiment provides an operationally reliable clamping device for the attaching means. Accurate operation of the clamping device is provided by linear displacing means for displacing the clamping beam(s). Suitable linear displacing means comprise for instance hydraulic cylinders connected to an outer end of one or more yokes which are rotatable about an axis and which are in turn mounted at another outer end on a clamping beam. The yokes are rotated about their axis by imparting a movement to the hydraulic cylinders, whereby the yoke outer ends connected to the clamping beam are displaced and the clamping beam is moved to the guide case of the hoisting yoke.

In an embodiment of the invention the device comprises a catching construction which is displaceable parallel to the lifting plane between a position in the vicinity of the boom and a position further removed from the boom and/or vice versa. A guide case of the hoisting yoke received in the catching construction can in this way be displaced efficiently between a position in the vicinity of the boom and a position further removed from the boom and/or vice versa. An outer surface of the guide case is preferably formed such that the guide case at different angles to the vertical direction can nevertheless be received close-fittingly in the catching construction. The different angles of the guide case are for instance the result of varying boom angles for the purpose of realizing the correct reach. An adequate form of the outer surface can for instance be obtained by giving a section of the outer surface running parallel to the lifting plane a round shape. The guide case of the hoisting yoke is for instance held at a correct height position here relative to the guide device by wheels arranged on both sides of the case construction. The movable catching construction can thus precisely enclose the guide case with a fixed length, this at a varying angle of the guide case relative to the guide device. In combination with an appropriate position control of the movable catching construction there is therefore no limitation to lifting/paying out or luffing within the active range of the guide device, and the hoisting yoke can moreover be precisely positioned.

Giving the guide case on the hoisting yoke the same external form as the attaching means/hoisting hook of the central hoisting device of the hoisting means also enables the guide device to be used to prevent undesired movements of the attaching means of the central hoisting device due to wind load.

The guide device is displaceable along the longitudinal axis of the boom by means of a displacing device. In an embodiment the displacing device is formed by first and second co-acting guide means provided on the guide device and the boom, for instance in the form of a pair of wheels and a T-beam, wherein the pair of wheels encloses a flange of the T-beam. A smooth displacement along the boom is thus obtained, wherein the pair of wheels ensures that the guide device cannot come away from the boom either in the direction of the boom or in a direction away from the boom or in the direction transversely of the boom.

Another embodiment of the device has the feature that the displacing device is configured so that the guide device follows the displacement of the hoisting yoke in the case that the hoisting yoke is raised or lowered. This is preferably realized with an embodiment in which the displacing device comprises a tensioning cable attached to the guide device and operated by a constant tension winch so that the tension force in the tensioning cable remains substantially constant, preferably in a manner such that the guide device rests on the guide case of the hoisting yoke while applying little vertical force. The guide case is equipped for this purpose on each side with a running wheel on which the guide device rests.

It is also advantageous to provide a device, the guide device of which comprises auxiliary devices, preferably a tugger winch with guide cable for manipulating and keeping control of the rotor blade. A lifted rotor blade can be engaged and manipulated with the guide cable (tugger cable) in order to enable a still more accurate positioning thereof. The guide cable is tightened or payed out by means of the tugger winch that is present. In a practical embodiment the tugger cable is guided along a cross beam connected to the frame of the guide device by means of pulleys mounted on the cross beam.

The invention likewise relates to a method for placing a rotor blade of a wind turbine while making use of the device according to the invention. The method comprises of providing a device according to the invention on a surface, attaching the rotor blade for placing to the attaching means via an elongate hoisting yoke which is mounted on the attaching means and which extends in a longitudinal direction of the rotor blade and which is suspended from at least one cable, wherein the movement of the attaching means is temporarily limited in a direction running transversely of the lifting plane by the guide device by means of displacing the displacing device along the longitudinal axis of the boom to the position of the attaching means, and placing the rotor blade on a support structure available at sea. In an embodiment of the method, the hoisting yoke and/or parts of the hoisting yoke are displaced in the longitudinal direction of the rotor blade during placing of the rotor blade onto the support structure available at sea. By making use of the device according to the invention a rotor blade can be mounted, particularly in substantially horizontal orientation or at an angle of 30° relative to the horizontal, on a support structure in windy conditions. The device conversely provides options for a new method of disassembling a structure, particularly a rotor blade of a wind turbine.

A method in which the hoisting yoke is suspended from at least two hoisting cables, whereby the at least two hoisting cables each comprise an attachment means, and whereby the at least two hoisting cables engage the hoisting yoke at a distance from each other in the longitudinal direction offers further advantages during placing and connecting the rotor blade onto the support structure.

Other suitable embodiments of the inventive methods are described in the appended claims.

BRIEF DESCRIPTION OF THE DRAWINGS

The invention will now be elucidated in more detail with reference to the accompanying figures, without otherwise being limited thereto. In the figures.

DETAILED DESCRIPTION OF THE INVENTION

Figure 1A:
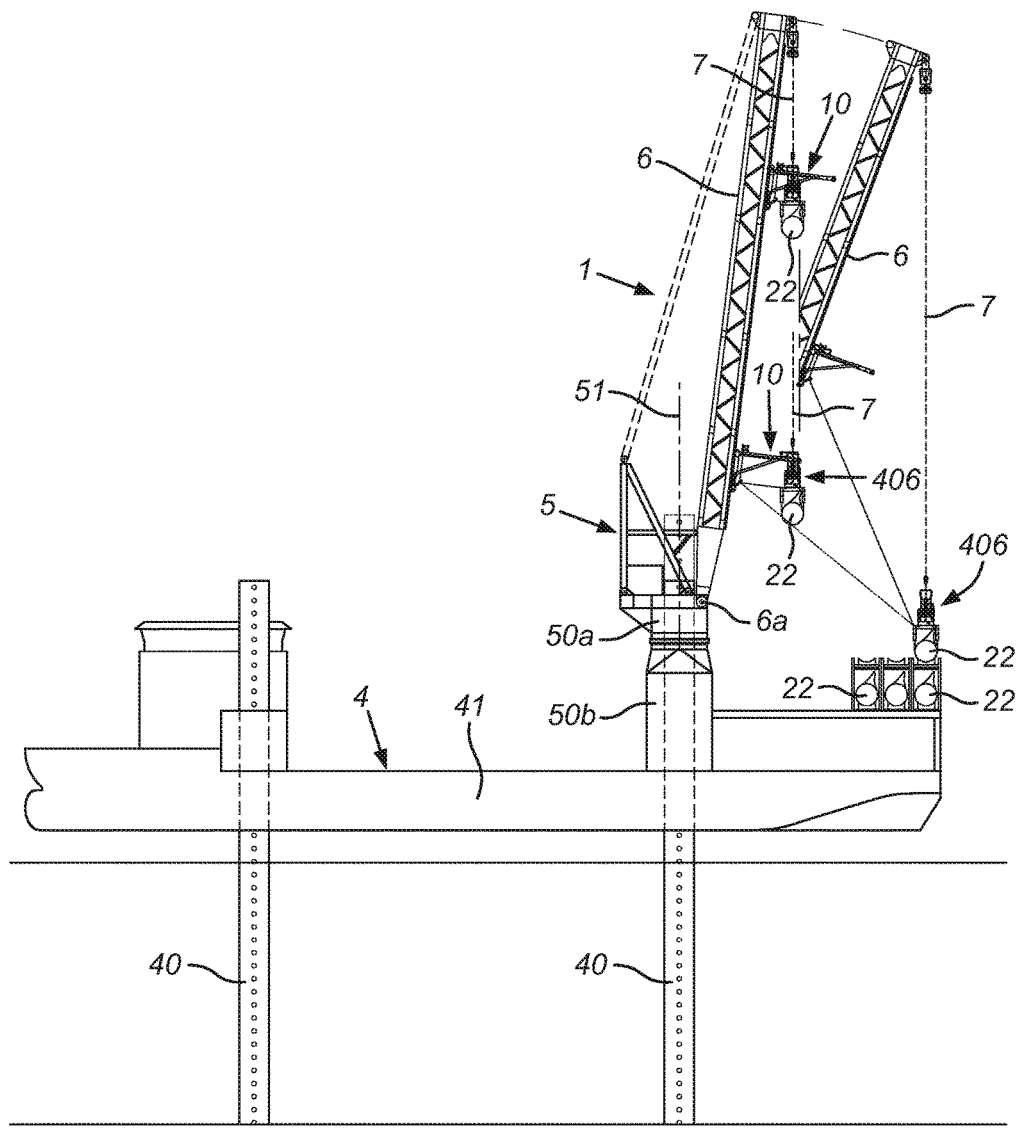
FIG. 1A-1B show schematic side views of an embodiment of the device according to the invention in different modes.
Figure 1B:
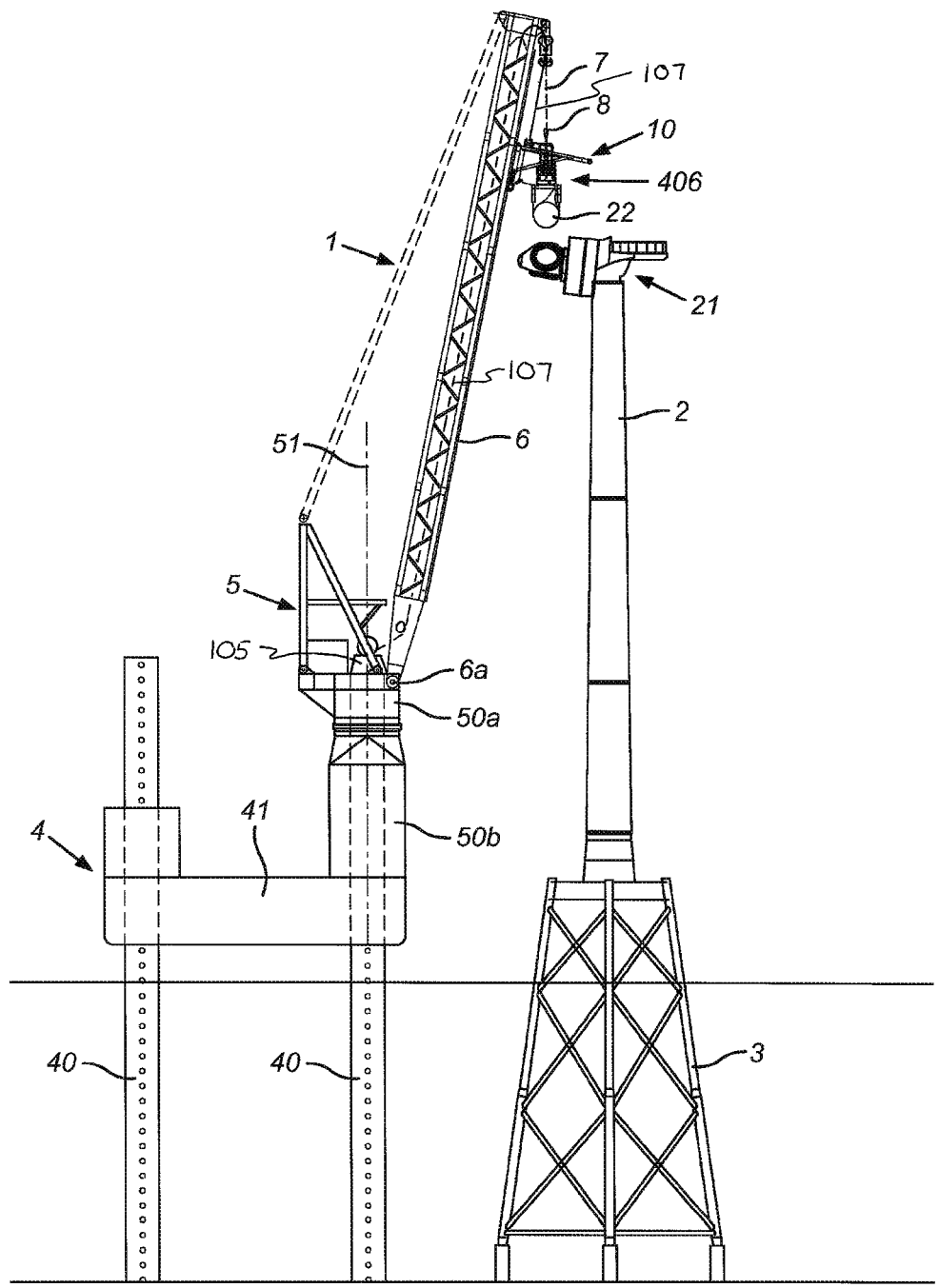

FIGS. 1A-1B show a side view of different modes of a device 1 according to the invention. The shown embodiment is configured for placing at sea of a rotor blade 22 on a wind turbine placed on a support structure in the form of a jacket 3. It will be apparent that the invention is not limited to a support structure in the form of a jacket, and that any other foundation can be used. The rotor blade 22 to be placed is shown in different positions in FIGS. 1A-1B. Device 1 comprises a hoisting means 5, preferably a crane, which is placed on a vessel 4 and a boom 6 of which is provided with two hoisting cables 7 (see FIG. 3B) on each of which an attaching means such as a hoisting hook 8 is arranged and to which a rotor blade 22 for lifting can be releasably attached via an elongate hoisting yoke 406 mounted on hoisting hook 8. Boom 6 is connected for pivoting around a fixed outer end 6*a* to a hoisting means platform 50*a*, which is in turn rotatable round a platform foundation 50*b* about a rotation axis 51. Boom 6 can be luffed in, i.e. raised, and luffed out, i.e. lowered, around pivot point 6*a* in known manner. In FIGS. 1A-1B hoisting hook 8 is likewise shown in different positions. Vessel 4 comprises a jack-up offshore platform provided with anchor piles 40 which support a work deck 41. Anchor piles 40 are movable in vertical direction to the seabed, and the height position of work deck 41 relative to the water level can be changed by displacing work deck 41 relative to piles 40 by means of (hydraulic) jacks or a gear rack-pinion drive system. If desired, work deck 41 is provided with storage locations for the rotor blades 22 to be lifted and positioned. In order to enable the method according to the invention to be performed the vessel 4 is moored in the immediate vicinity of the support structure 3 available at sea, and in any case such that support structure 3, and more specifically the mast 2 of a wind turbine, lies within reach of hoisting means 5 with boom 6 in luffed-out position.

Figure 2A:
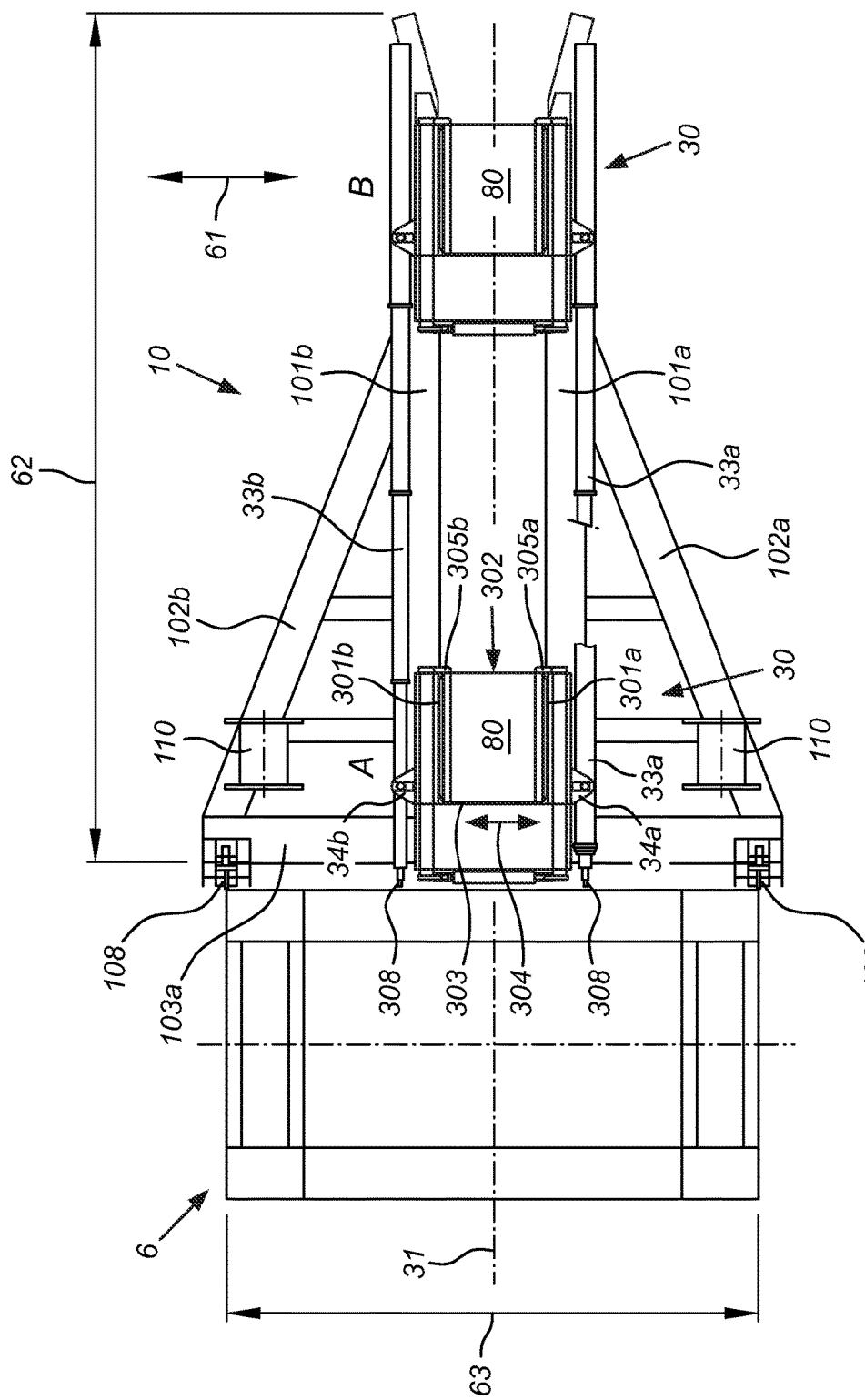
FIGS. 2A and 2B show respectively a schematic top side view and side view of an embodiment of a guide device as applied in the invention; and finally
Figure 2B:
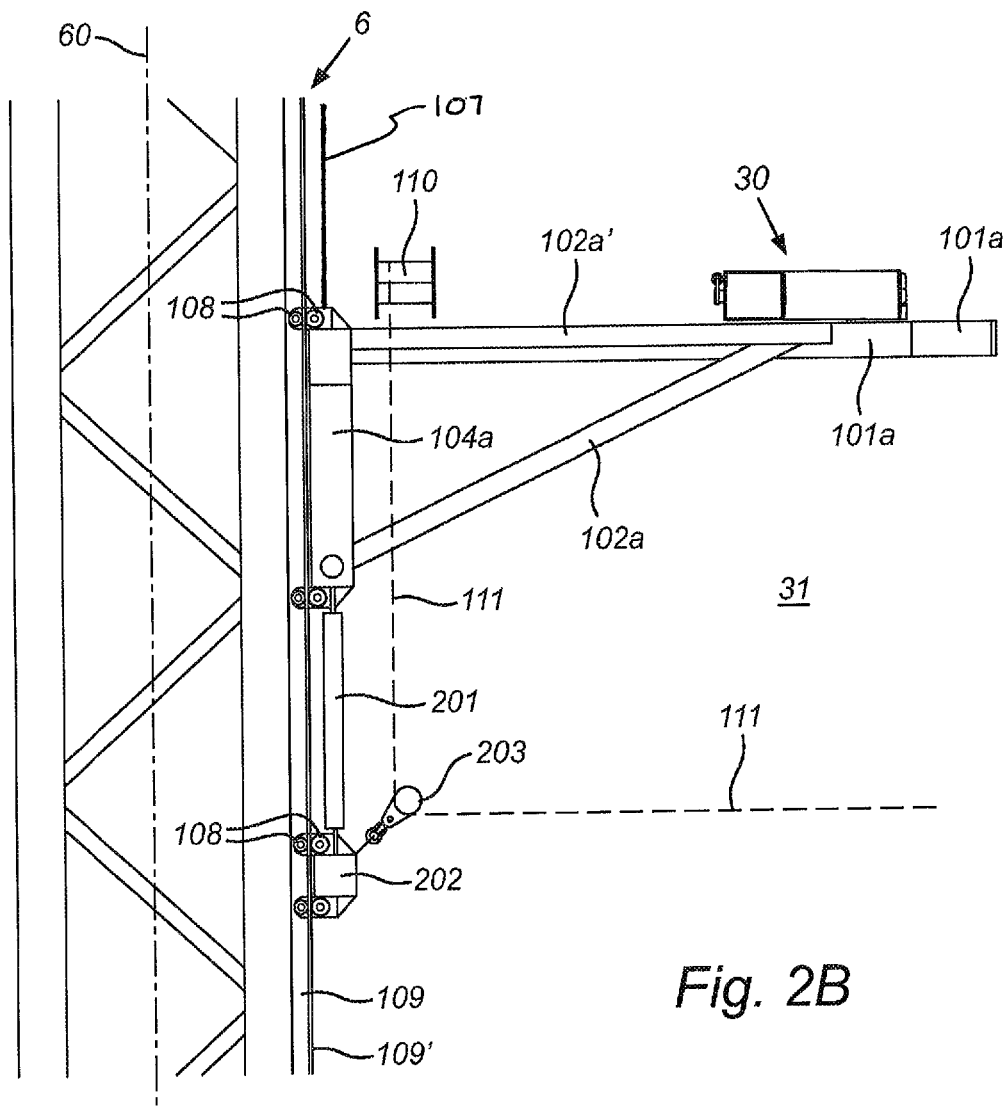

Referring to FIGS. 2A and 2B, boom 6 further comprises a guide device 10 for hoisting yoke 406 with which the movement of hoisting yoke 406 can be limited in at least one direction 61. This limited direction 61 will generally be a direction running transversely of the longitudinal axis 60 of boom 6, although this is not essential.

According to FIG. 2A hoisting yoke 8 (not shown) comprises between the two hoisting cables 7 a guide body in the form of guide case 80 which fits with little clearance in the catching construction of the guide device, as will be elucidated in more detail below. Guide case 80 is provided on both sides with wheels 80*a* and 80*b* on which guide device 10 can rest while applying little force. Because guide device 10 rests while applying relatively little weight on wheels (80*a*, 80*b*) of guide case 80, guide device 10 will follow guide case 80 of hoisting yoke 406 in a substantially passive manner. A hoisting winch, or constant tension winch 105, of guide device 10 serves to absorb the relatively low weight, wherein the winch is preferably adjusted via a so-called constant tension operation mode. The greater part of the weight is absorbed by the tension force in the hoisting cable of guide device 10. The wheels (80*a*, 80*b*) of guide case 80 ensure that guide case 80 encounters substantially no resistance forces in the longitudinal direction of guide device 10 (the direction of beams 101*a*, 101*b*, see below) and so remains suspended substantially vertically under hoisting hooks 8.

An embodiment of guide device 10 is shown in more detail in FIGS. 2A and 2B. The shown guide device 10 comprises a frame of mutually connected beams, at least two beams (101*a*, 101*b*) of which extend from a rectangular base frame, which is formed by two transverse beams (103*a*, 103*b*) and two vertical beams (104*a*, 104*b*), from boom 6 in the direction of guide case 80, this substantially perpendicularly of the longitudinal axis 60 of boom 6. The frame is further reinforced by two inclining beams (102*a*, 102*b*) and two inclining beams (102*a*', 102*b*'). The length of the beams (101*a*, 101*b*) is such that they at least partially enclose guide case 80. The two beams (101*a*, 101*b*) preferably extend from boom 6 over a perpendicular distance 62 of a maximum of twice the boom width 63 in order to provide sufficient stiffness. Guide device 10 is configured to limit movement of guide case 80 (and so also of hoisting yoke 406 which is connected to guide case 80) in a direction 61 running transversely of the lifting plane, while movement of guide case 80 in the lifting plane 31 is not impeded to any significant extent by guide device 10. The position of guide case 80 in the lifting plane is largely determined by the inclination of boom 6 relative to the vertical direction.

In order to enable accurate placing of a rotor blade 22 attached to hoisting yoke 406, the device comprises in an embodiment a catching construction 30 which is configured to receive and displace guide case 80 in lifting plane 31 between a position A in the vicinity of boom 6 and a position B further removed from boom 6. Catching construction 30 is for this purpose displaceable in lifting plane 31 from the position A in the vicinity of the boom to the position B further removed from the boom.

Figure 3A:
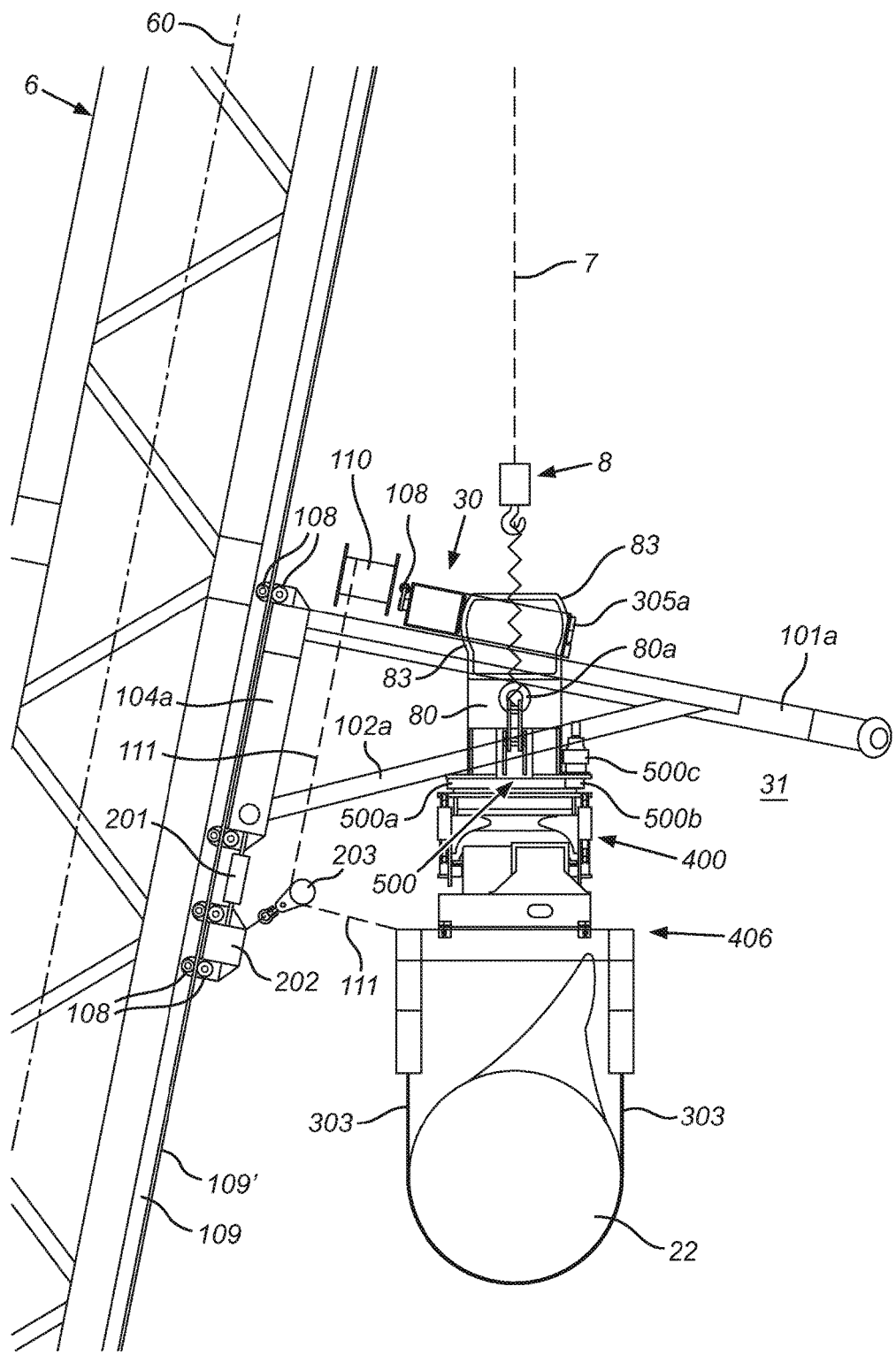
FIGS. 3A and 3B show respectively a schematic side view and front view of an embodiment of a device wherein the hoisting yoke is suspended from two hoisting cables engaging at a distance from each other in the longitudinal direction.

Catching construction 30 comprises a frame of mutually connected beams or wall parts. The wall parts comprise two side wall parts (301*a*, 301*b*), which extend parallel to the lifting plane 31 from boom 6 in the direction of guide case 80, a rear wall part 303 facing toward boom 6 and a front side 302 which is remote from boom 6 and at least temporarily accessible by guide case 80, or at least the hoisting block 80 thereof. Provided for this purpose in the plane of front side 302 are wall parts or catches (305*a*, 305*b*) retractable and extendable in a direction 304 transversely of lifting plane 31. With catches (305*a*, 305*b*) retracted the front side 302 is accessible by guide case 80 of hoisting yoke 406, whereas with catches (305*a*, 305*b*) extended the front side 302 allows guide case 80 of hoisting yoke 80 to be received at least temporarily in the space bounded by the wall parts (301*a*, 301*b*, 303, 305*a* and 305*b*). Receiving takes place such that there is sufficient clearance between said wall parts and the outer surface of guide case 80 so that in the received position guide case 80 (and so hoisting yoke 406) can rotate during use around a horizontal axis 82 running transversely of lifting plane 31. In order to make this rotation possible the outer surface 83 of guide case 80 is curved on the upper side thereof, whereby the cross-section parallel to lifting plane 31 is arcuate as shown in FIG. 3A.

Catching construction 30 is displaceable over beams (101*a*, 101*b*) of guide device 10 relative to guide device 10 by means of linear displacing means, for instance in the form of hydraulic piston cylinders (33*a*, 33*b*). Piston cylinders (33*a*, 33*b*) are connected via connecting plates (34*a*, 34*b*) to the frame of the catching construction, more specifically to wall parts (301*a*, 301*b*). Catching construction 30 with guide case 80 of hoisting yoke 406 enclosed therein can thus be displaced to a position A in the vicinity of boom 6 by retracting the hydraulic piston cylinders (33*a*, 33*b*). Catching construction 30 with the guide case 80 of hoisting yoke 406 enclosed therein can be carried to a position B further removed from boom 6 by extending the hydraulic piston cylinders (33*a*, 33*b*). Hoisting yoke 406, together with a component, such as for instance a rotor blade 22, hooked fixedly thereon, can in this way be positioned with great precision relative to guide device 10, and so also relative to boom 6, this in a manner substantially not susceptible to wind.

Guide device 10 is connected to boom 6 for displacement along longitudinal axis 60 by means of a displacing device (108, 109, tensioning cable 107, hoisting sheave and winch 105). Guide device 10 and boom 6 are provided for this purpose with first and second co-acting guide means (108, 109) which, together with a tensioning cable 107, hoisting sheave and winch 105, mounted on guide device 10, form the displacing device. The first guide means comprise sets of wheels 108 arranged on the base frame (103, 104) and the second guide means comprise T-beams 109 connected to the side of boom 6 facing toward guide device 10. Each pair of wheels 108 encloses the flange of a corresponding T-beam 109, wherein wheels of a set of wheels 108 are situated on either side of the flange and roll thereover. Each set of wheels is particularly provided with a wheel which runs on flange 109' of the T-profile 109 provided on the boom box girder for the purpose of absorbing pressure forces and two running wheels running on the other side against flange 109' of T-profile 109 for the purpose of absorbing tension forces. Also provided if desired on one side of the boom are transverse rollers running on the end surface of flange 109' of T-profile 109 in order to hold guide device 10 on the rails in transverse direction. Depending on the wheel load, wheels can optionally be replaced by double wheel bogies. It is of course possible to realize other methods of displaceability along boom 6.

Catching construction 30, and more specifically the hydraulic piston cylinders (33a, 33b) are provided with a fastening eye 308 fixedly connected to guide device 10 via transverse beam 103a. The (telescopic) hydraulic cylinders (33a, 33b) are therefore secured at the rod end to the guide frame. Cylinders (33a, 33b) push against this frame during outward movement in the direction of position B or pull thereon during inward movement in the direction of position A. Because catching construction 30 is connected (via rocker pins) to the cylinder surfaces, it co-displaces with the cylinder surfaces. The embodiment of catching construction 30 shown in the figures is provided with a sliding guide in the form of a T-shaped structure on longitudinal beams 101a and 101b on both sides of catching construction 30. Catching construction 30 cannot hereby undergo any displacement (except for the clearance in the guide) in a plane perpendicularly of main beams 101 of the guide device. Wheels can also be applied instead of a sliding guide.

The tensioning cable 107 attached to guide device 10 is preferably operated by a constant tension winch 105 so that the tension force in the tensioning cable 107 remains substantially constant and is kept at a generally relatively low value in the situation where the guide device is active and rests while applying little force on the wheels of guide case 80. The constant tension winch is situated for instance on boom 6, for instance on a transverse box girder in the area surrounding the hinge construction in the vicinity of hinge 6a, roughly in the centre of the boom. The hoisting sheave for the guide device is preferably situated at the upper outer end of boom 6.

Guide device 10 can be provided if desired with auxiliary devices. As shown in FIG. 2B, such an auxiliary device can comprise a tugger winch 110. Running from tugger winch 110 is a guide cable 111 (tugger cable) which can be connected to a component connected to hoisting yoke 406.

A rotor blade 22 connected to guide cable 111 can be kept under control by lengthening or shortening guide cable 111 using winch 110.

Guide cable 111 can be connected to base frame (103, 104) in simple manner via a suspension frame (201, 202) which is connected to base frame (103, 104) and constructed from vertical beams 201 and a cross beam 202, which is likewise provided with sets of wheels 108 co-acting with T-beam 109. Cross beam 202 has sufficient length to suspend pulleys 203 from the outer ends such that the guide cables can engage roughly at a right angle on the component for lifting. This results in the most efficient guiding of the tugger system. Vertical beams 201 can also be hydraulic piston cylinders with which the distance between beam 202 and base frame (103, 104) can be varied. This is useful for giving guide cable 111 a favourable position relative to a component connected to hoisting hook 8.

Figure 3B:
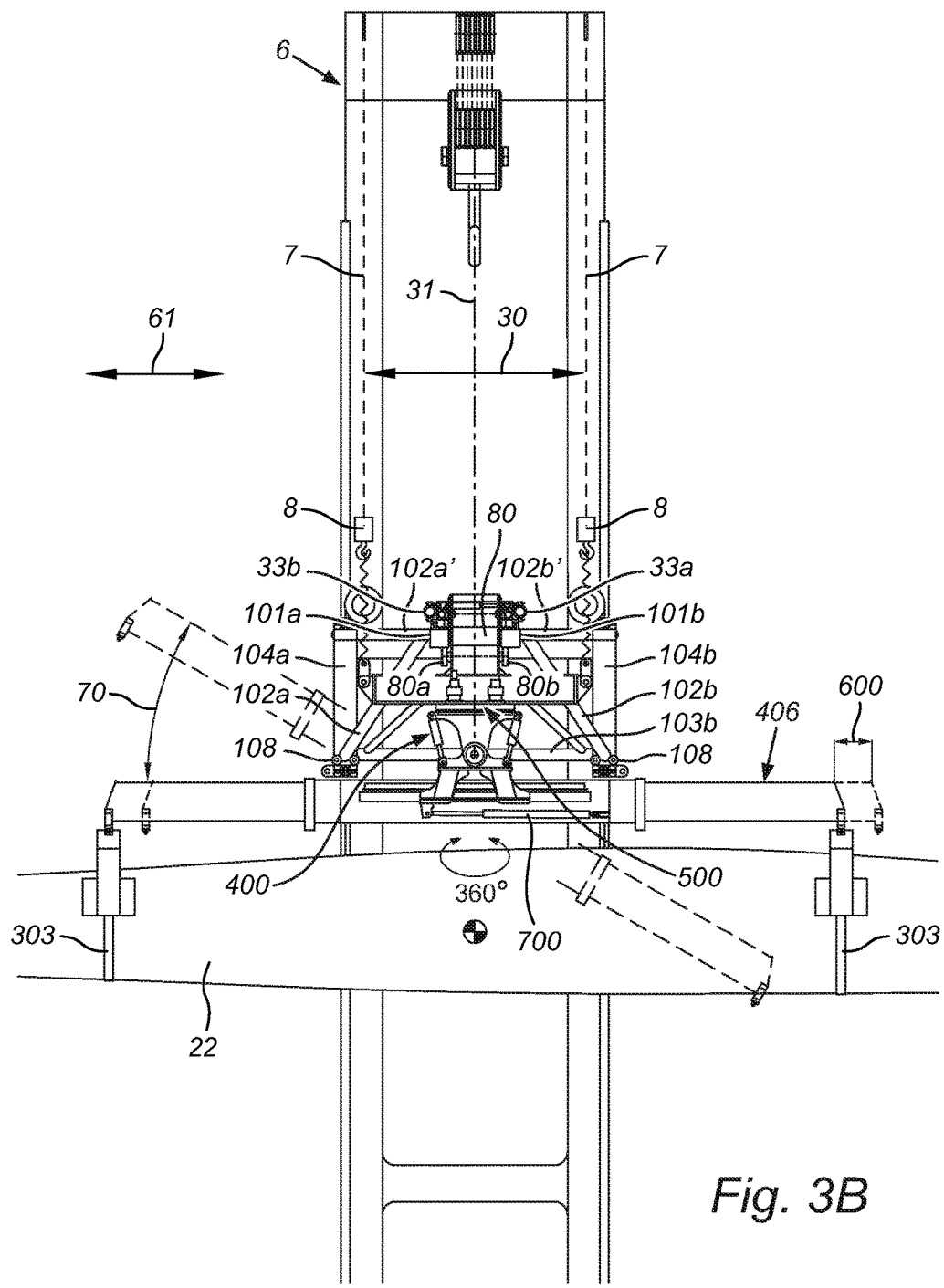

Referring to FIGS. 3A and 3B, hoisting yoke 406 is suspended according to the invention from two hoisting cables 7 engaging at distance 30 from each other in the longitudinal direction of hoisting yoke 406. This achieves that deformation of guide device 10 due to a displacement of the centre of gravity of the rotor blade in the vertical plane formed by hoisting cables 7 is prevented. This displacement, indicated with side shift 600 in FIG. 3B, is usually horizontal or at an angle of typically 30° to the horizontal. The displacement is particularly useful for the purpose of sliding the fastening bolts in the blade root of rotor blade 22 precisely into the corresponding holes in the hub of the nacelle without additional crane movements. A displacement of the centre of gravity 32 of rotor blade 22 in a vertical plane formed by hoisting cables 7 causes only a differing tensile load in hoisting cables 7. The mutual distance 30 between hoisting cables 7 can be selected within broad limits, but is preferably large enough and such that the centre of gravity of rotor blade 22, in combination with hoisting yoke 406, mechanism 400 and guide case 80, is situated between the substantially vertical hoisting cables 7. In addition to preventing undesirable torsional stress and deformation of guide device 10, undesired displacements of the fastening bolts in the blade root of rotor blade 22 are also prevented with this method, and assembly thereof in the hub of the nacelle with a side shift displacement 600 is easily realizable.

FIGS. 3A and 3B show an embodiment wherein guide case 80 is connected by means of a mechanism 400 to the elongate hoisting yoke 406 in the form of a rotor blade spreader extending in transverse direction 61. A wind turbine blade 22 is releasably attached to spreader 406, wherein rotor blade 22 extends substantially parallel to the longitudinal direction of hoisting yoke 406. Rotor blade 22 is suspended here substantially in a horizontal position but can be placed at an angle of inclination 70 other than zero with the horizontal direction by rotating the hoisting yoke 406 around a horizontal axis.

According to the invention the rotor blade spreader 406 is suspended by means of the two hoisting cables 7 engaging at distance 30 from each other in the longitudinal direction of hoisting yoke 406.

In the shown embodiment the mechanism 400 has the following four degrees of freedom:
1. Rotation around a substantially vertical axis by means of a rotator 500. This is shown in FIG. 3A as a slewing bearing 500a with external toothing, drive pinion(s) 500b and drive motor(s) 500c.
   The rotator can also be realized with other drive means, such as an internal toothing or with a mechanism having for instance hydraulic cylinders. Greater rotation angles, or even unlimited rotation, can however be realized using a stewing mechanism.
2. Rotation around a longitudinal axis perpendicularly of the elongate hoisting yoke 406. Rotor blade 22 can hereby be oriented either in a substantially horizontal position or in an oblique, typically substantially 30° position. The position required depends on the position of the blade root attachments in the hub of the nacelle.
3. Linear displacement 600, side shift, whereby the fastening bolts of rotor blade 22 can be inserted into the corresponding holes in the hub of the nacelle without additional displacements of hoisting means 5. The displacement 600, side shift, is preferably realized with means for displacing the hoisting yoke, such as hydraulic cylinder(s) 700 which bring about a displacement of hoisting yoke 406.
4. Linear displacement of the bearing arms of spreader 406 in both directions along direction 61 in order to adjust the width of the attachments of rotor blade 22 to the rotor blade construction.

A rotor blade 22 can be suspended in two slings 303 attached to the spreader, as already described above in an embodiment with a hoisting yoke 400 or 406. The combination of only several displacement and rotation actuators and the suspension from hoisting cables 7 provides the option of precisely placing a wind turbine blade 22 in a random orientation relative to boom 6, support structure 3 and a nacelle 21 which is mounted on mast 2 and to which rotor blade 22 has to be attached.

It will be apparent that power supply means (not shown) such as batteries, motors, pumps and the like are present for the purpose of operating the different components of guide device 10, such as for instance the tugger winches and the hydraulic cylinders. It is also possible to place these provisions wholly or partially on crane structure 5, wherein the hydraulic hoses, electrical and mechanical cables and the like required for the purpose of actuating the components are run along the boom to guide device 10. The power supply means are however preferably provided on guide device 10 itself, and the required energy is carried via a so-called umbilical hoisting cable to guide device 10. An umbilical hoisting cable comprises a steel cable, the core of which comprises not a strand but for instance an electrical power supply cable. Energy can in this way be carried easily to guide device 10 via for instance slide rings in the hoisting winch drum of guide device 10. Power supply to the diverse actuators on the rotor blade spreader is provided most easily by electrical or hydraulic accumulators on the spreader itself. The operation of the diverse functions is performed most easily using radio remote control.

FIGS. 1A-1B illustrate the placing of a wind turbine blade 22 on a wind turbine mast 2 provided with a nacelle 21 using a method according to the invention. The method comprises of providing a device 1 according to the invention on a vessel 4 and placing a rotor blade 22 from vessel 4 onto a support structure 3 present at sea using hoisting means 5, wherein the rotor blade 22 for placing is attached to guide case 80 via an elongate hoisting yoke 406 which is mounted on guide case 80 and which is suspended from two hoisting cables 7 engaging at a distance from each other in the longitudinal direction of hoisting yoke 406. The movement of guide case 80 (and so also of hoisting yoke 406) is temporarily limited in at least one direction by guide device 10 by means of displacing the displacing device (108, 109, tensioning cable) from the highest position in the boom along longitudinal axis 60 of boom 6 to the position of hoisting hook 8. After guide device 10 has come into contact with wheels 80a of guide case 80, the hoisting winch of guide device 10 is set into constant tension operation. During lifting and paying out of hoisting yoke 406 the guide device 10 therefore continues to follow guide case 80 of hoisting yoke 406 passively because the guide device rests while applying little weight on the wheels (80a, 80b) of guide case 80. In this situation the transverse movement of guide case 80 in direction 61 is prevented by beams 101a, 101b. Guide case 80 is then received in the catching construction 30 shown in FIGS. 2A and 2B, whereby the movement of guide case 80 relative to guide device 10 is substantially prevented when catching construction 30 is in stationary position. When hoisting hooks 8 are displaced up or downward or when boom 6 is tilted around rotation shaft 6a via the operating means of hoisting means 5, the control of hydraulic cylinders (33a, 33b) ensures that the catching construction is positioned so that hoisting cables 7 remain substantially vertical during this operation of hoisting means 5.

Once rotor blade 22 has been displaced into the vicinity of the assembly location, according to the invention a fine positioning which is substantially not susceptible to wind influences can take place by displacing catching construction 30 with guide case 80 received therein in longitudinal direction, substantially perpendicularly of the vertical plane formed by hoisting cables 7, between a position in the vicinity of boom 6 and a position further removed from boom 6 and/or vice versa. The relative displacement of catching construction 30 relative to guide device 10 is parallel to guide beams 101a, 101b. Hoisting cables 7 are then no longer vertical. In order to limit the horizontal force acting here on catching construction 30, the stroke length for the fine positioning is limited via position measurement of catching construction 30 or force measurement in hydraulic cylinders (33a, 33b).

The method according to the shown embodiment comprises the steps, among others, of taking up a hoisting yoke 406 to which a rotor blade 22 is attached from work deck 41 of vessel 4 using hoisting hooks 8, wherein guide device 10 is held in a position such that hoisting yoke 406 can move freely. Hoisting hooks 8 can hereby move in simple manner on and along work deck 41, for instance in storage racks for the components, without this movement being impeded by the guide device mounted on boom 6. Boom 6 is then tilted upward around rotation shaft 6a (luffed in) until it runs so steeply that guide case 80 of hoisting yoke 406 comes within reach of guide device 10 (in a direction transversely of boom 6). Guide device 10 is then displaced along the longitudinal axis 60 of boom 6 roughly to the position of guide case 80, wherein guide device 10 rests on the wheels (80a, 80b) of guide case 80, after which the hoisting winch (not shown) of guide device 10 is set into constant tension operation so that guide device 10 passively follows the displacements of boom 6 and guide case 80. Guide case 80 is subsequently engaged fixedly with catching construction 30 of guide device 10 in the manner described in detail above. Hoisting yoke 406 provided with rotor blade 22 is then raised, wherein guide device 10 passively follows the movement of guide case 80 of hoisting yoke 406 and the position of the catching construction is actively controlled so that hoisting cables 7 remain substantially vertical. Boom 6 is subsequently pivoted around rotation axis 51 to a position in the vicinity of the desired assembly position (see FIG. 1B), and boom 6 is optionally tilted a little further until rotor blade 22 is situated in the desired assembly position. Hoisting yoke 406 can be moved further up and downward in the engaged position by tightening or paying out hoisting cables 7.

Rotor blade 22 is subsequently positioned such that the fastening bolts in the blade root come to lie against the corresponding holes in the hub of nacelle 21. Following this latter step with hoisting means 5, horizontal displacements of rotor blade 22, or displacements wherein rotor blade 22 is situated at an angle 70 other than zero with the horizontal direction, which preferably amounts to 30°, are brought about by displacing hoisting yoke 406 with a side shift 600, wherein the tension in the two hoisting cables 7 will be different but undesirable displacement of the blade root bolts resulting from displacement of the centre of gravity is prevented.

The invention claimed is:

1. A device for placing a rotor blade of a wind turbine, comprising a hoisting means which is placed on a surface which hoisting means comprises a boom rotatable around a substantially vertical rotation axis, which boom is provided with at least two hoisting cables connected to the boom, wherein the at least two hoisting cables each comprise an attaching means to which an elongate hoisting yoke is mounted for attaching a rotor blade to be placed, the hoisting yoke extending in a longitudinal direction of the rotor blade, wherein a lifting plane is defined by the boom and the substantially vertical rotation axis, wherein the boom further comprises a guide device comprising a frame of mutually connected beams, of which at least two beams extend from the boom in the direction of the attaching means and are configured to limit movement of the hoisting yoke in a direction running transversely of the lifting plane, wherein the at least two beams at least partially enclose opposing sides of a guide case which guide case is attached to the hoisting yoke, and which guide device is connected to the boom by a displacing device displaceable along a longitudinal axis of the boom, and wherein the displacing device or the hoisting yoke comprises a displacer for displacing the hoisting yoke or parts of the hoisting yoke relative to the guide case in the longitudinal direction of the rotor blade, and wherein the attaching means are connected at a distance from each other to the hoisting yoke in the longitudinal direction of the hoisting yoke.

2. The device as claimed in claim 1, wherein the guide device is configured to also limit movements of the hoisting yoke in the lifting plane.

3. The device as claimed in claim 1, wherein the hoisting yoke comprises further means for displacing the hoisting yoke or parts of the hoisting yoke also in other linear directions than a length direction of the rotor blade, or a rotator for rotating the hoisting yoke or parts of the hoisting yoke.

4. The device as claimed in claim 3, wherein the device or the hoisting yoke comprises a rotator for rotating the hoisting yoke or parts of the hoisting yoke about a vertical axis located in the lifting plane.

5. The device as claimed in claim 3, wherein the device or the hoisting yoke comprises a rotator for rotating the hoisting yoke or parts of the hoisting yoke solely about a horizontal or vertical axis located in the lifting plane.

6. The device as claimed in claim 1, wherein the hoisting yoke comprises a rotor blade spreader.

7. The device as claimed in claim 1, wherein the hoisting yoke comprises slings for engaging the rotor blade.

8. The device as claimed in claim 1, wherein the displacing device is configured such that the guide device follows the displacement of the hoisting yoke.

9. The device as claimed in claim 1, wherein the guide device comprises a catching construction displaceable parallel to the lifting plane between a position in the vicinity of the boom and a position further removed from the boom or vice versa.

10. The device as claimed in claim 9, wherein the hoisting yoke comprises a guide case which fits with little clearance in the catching construction of the guide device.

11. The device as claimed in claim 9, wherein the displacing device comprises a tensioning cable attached to the guide device and operated by a constant tension winch so that a tension force in the cable remains substantially constant.

12. The device as claimed in claim 1, wherein the guide device comprises auxiliary devices for manipulating the rotor blade.

13. A method for placing a rotor blade of a wind turbine, the method comprising: providing a device as claimed in claim 1 on a surface, attaching the rotor blade to be placed to an attaching means via an elongate hoisting yoke which is mounted on the attaching means and which extends in a longitudinal direction of the rotor blade and which is suspended from at least two hoisting cables that engage the hoisting yoke at a distance from each other in the longitudinal direction of the hoisting yoke, and wherein movement of the hoisting yoke is temporarily limited in a direction running transversely of a lifting plane by a guide device comprising a frame of mutually connected beams, of which at least two beams extend from the boom in the direction of the attaching means, whereby the at least two beams at least partially enclose a guide case provided on the hoisting yoke to limit the movement of the guide case, and wherein the hoisting yoke or parts of the hoisting yoke are displaced in the longitudinal direction of the rotor blade, and placing the rotor blade on a support structure available at sea.

14. The method as claimed in claim 13, wherein the hoisting yoke or parts of the hoisting yoke are also displaced in other linear directions than the longitudinal direction, or the hoisting yoke or parts of the hoisting yoke are rotated.

15. The method according to claim 14, wherein the hoisting yoke or parts of the hoisting yoke are rotated about a horizontal axis located in the lifting plane.

16. The method according to claim 14, wherein the hoisting yoke or parts of the hoisting yoke are rotated about a vertical axis located in the lifting plane.

17. The method as claimed in claim 13, wherein the rotor blade is attached to the hoisting yoke by slings.

18. The method as claimed in claim 13, wherein the guide device follows the displacement of the hoisting yoke.

19. The method as claimed in claim 13, wherein a catching construction of the guide device is displaced parallel to the lifting plane between a position in the vicinity of the boom and a position further removed from the boom.

20. The method as claimed in claim 19, wherein the hoisting yoke comprises a guide case which is received with little clearance in the catching construction of the guide device.

21. The method as claimed in claim 13, wherein the guide device is displaced by a tensioning cable attached thereto with a substantially constant tension force along the longitudinal axis of the boom.

22. The method as claimed in claim 13, wherein the surface comprises a vessel and components are placed on a support structure available at sea.

* * * * *